C. W. HOUGLAND.
VEGETABLE TOPPER.
APPLICATION FILED DEC. 10, 1919.
1,349,204.
Patented Aug. 10, 1920.
3 SHEETS—SHEET 1.
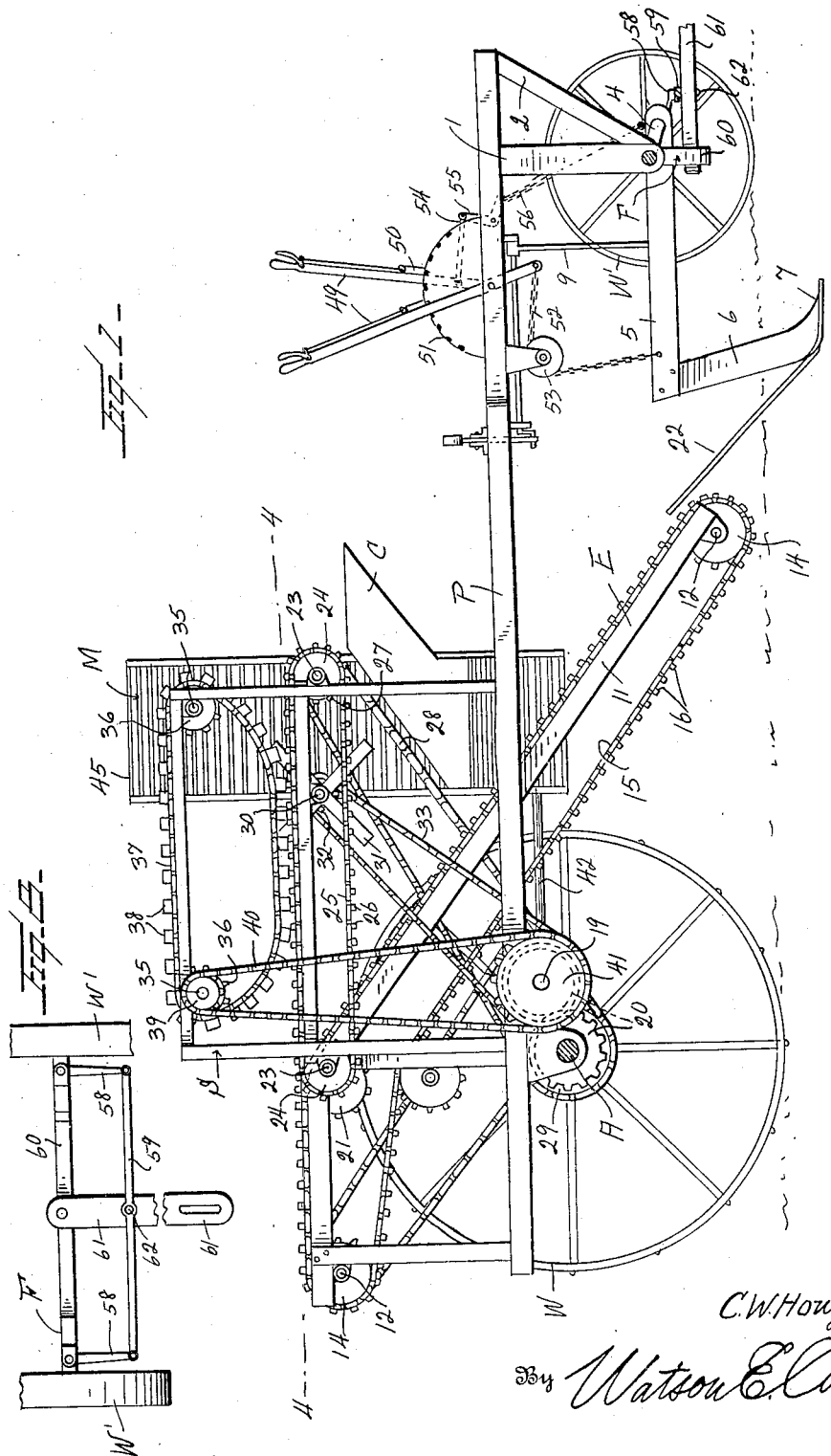
Inventor
C. W. Hougland
By Watson E. Coleman
Attorney

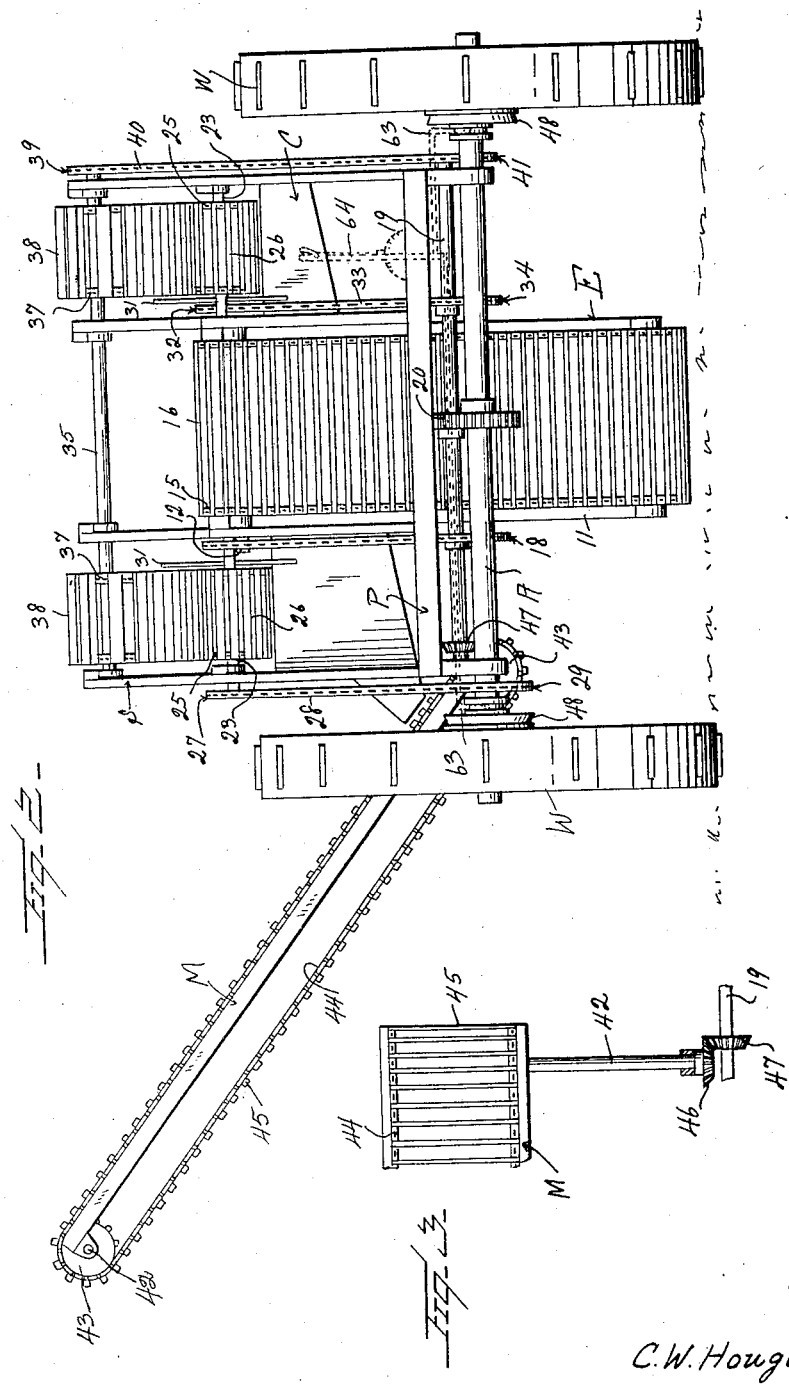

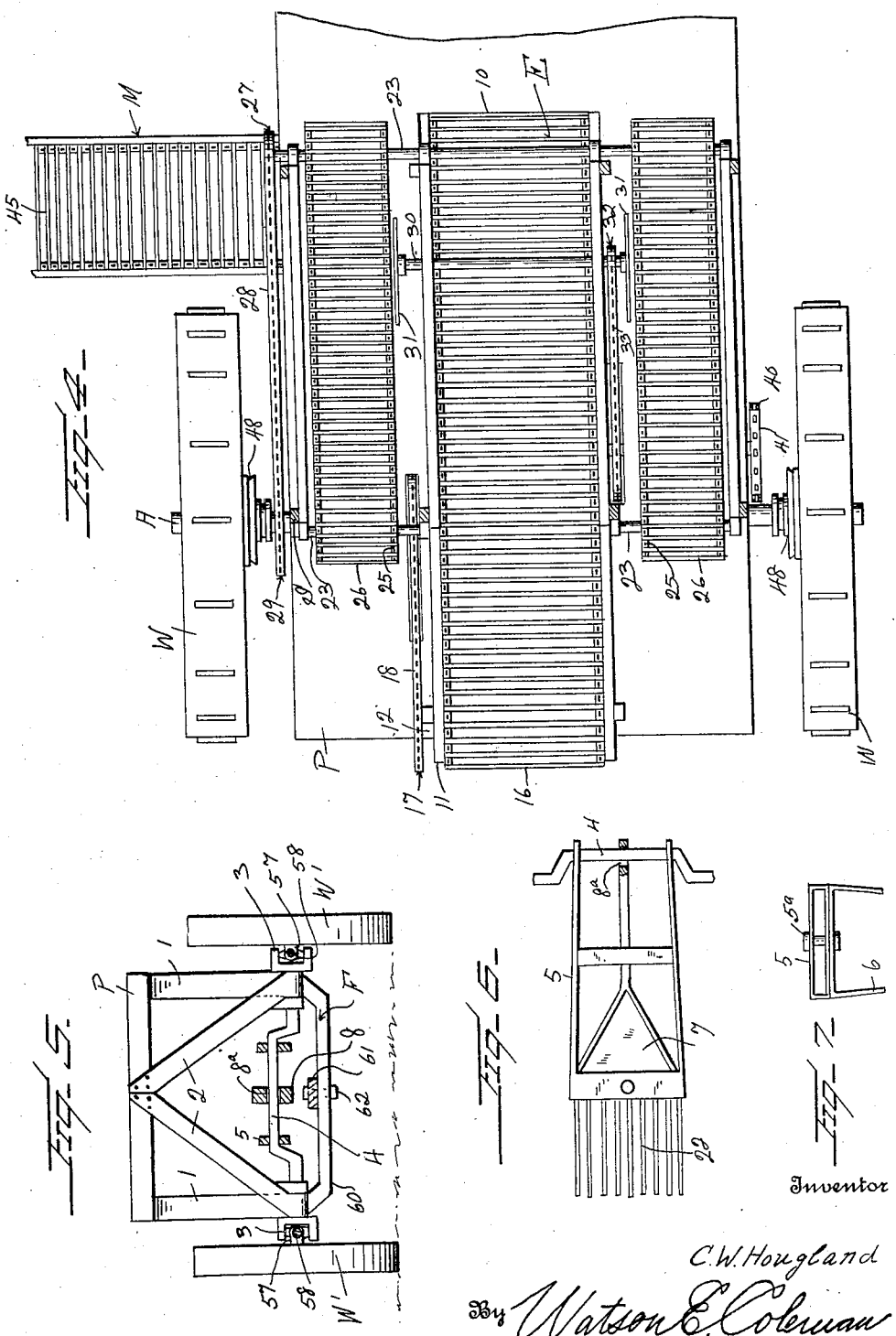

UNITED STATES PATENT OFFICE.

CLARENCE W. HOUGLAND, OF SEAL BEACH, CALIFORNIA.

VEGETABLE-TOPPER.

1,349,204.

Specification of Letters Patent. Patented Aug. 10, 1920.

Application filed December 10, 1919. Serial No. 343,786.

*To all whom it may concern:*

Be it known that I, CLARENCE W. HOUGLAND, a citizen of the United States, residing at Seal Beach, in the county of Orange and State of California, have invented certain new and useful Improvements in Vegetable-Toppers, of which the following is a specification, reference being had to the accompanying drawings.

This invention relates to certain improvements in harvesters and has relation more particularly to a machine of this general character particularly adapted for use in harvesting beets or the like, and it is an object of the invention to provide a novel and improved machine of this general character wherein the beets are lifted from the soil for delivery to a feeder, which feeder operates to convey the lifted beets or the like to a cutting mechanism for severing the tops thereof.

It is also an object of the invention to provide a device of this general character including a novel and improved feeder for conveying and lifting beets to a cutting means for severing the tops thereof, and which feeding means operates to hold the beets in a manner to assure the desired cutting operation.

Another object of the invention is to provide a device of this general character including a novel and improved feeding means comprising two vertically arranged endless members having the opposed stretches thereof substantially in contact, and wherein the upper endless member is of a character to maintain the beets or the like arranged upon the lower conveyer against displacement before the same reach the cutting mechanism, and which would otherwise possibly occur from the vibration of the machine during its travel, and from other causes.

Furthermore it is an object of the invention to provide a novel and improved machine of this general character embodying an elevating mechanism to convey the severed beets or the like to a barge traveling with the machine, and wherein a chute leading from the cutting mechanism conveys the severed beets to the elevating mechanism.

The invention consists in the details of construction and in the combination and arrangement of the several parts of my improved harvester whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a harvester constructed in accordance with an embodiment of my invention;

Fig. 2 is a rear elevation of the harvester as herein disclosed,

Fig. 3 is a fragmentary view illustrating the driving means for the elevating mechanism for the severed beets;

Fig. 4 is a sectional view taken substantially on the line 4—4 of Fig. 1;

Fig. 5 is a detailed view in front elevation of the harvester, as herein disclosed;

Fig. 6 is a view in plan of the lifting plow and frame;

Fig. 7 is a detailed view in elevation illustrating the swivel connection between the plow and the frame, and, Fig. 8 is a fragmentary view in top plan illustrating the means for imparting steering movement to the front supporting wheels.

As disclosed in the accompanying drawings, P denotes a platform of desired configuration and dimensions, and which has its rear end portion mounted upon the transversely extending axle A. Mounted on the extremities of the axle A are the wheels W, which wheels, upon the advance of the machine, operate to drive or rotate the axle A. The forward end portion of the platform P is provided adjacent its opposite sides with the depending standards 1, suitably affixed at their lower end portions with the opposite end portions of the front axle F. Also coacting with the opposite end portions of the front axle F and the central portion of the front end of the platform P are the upwardly converging brace members 2.

Connected with the opposite ends of the front axle F by the knuckle joints 3 or the like are the spindles 57, upon each of which is mounted a front supporting wheel W'.

The inner end portions of the spindles 57 are provided with the forwardly directed spindle arms 58 connected at their outer extremities by a connecting or steering rod 59. The central portion of the axle F is downwardly arched, as at 60, with which is pivotally engaged at its central portion an extremity of a draft tongue 61. The tongue 61 extends forwardly of the machine, and is also pivotally engaged, as at 62, with the connecting or steering rod 59, so that upon lateral swinging movement of the tongue 61 the wheels W' will be turned in a corresponding direction, so that an effective steering of the machine may be accomplished.

Operatively engaged with the opposite end portions of the axle F, and substantially overlying the arched portion 60 of said axle is an upstanding arch 4. Supported by the arch 4 and extending forwardly and rearwardly thereof is a frame 5. Swiveled by the bolt 5ª, or the like to the rear portion of the frame 5 is a depending standard 6 provided at its lower end with a lifting plow 7. The upper end portion of the standard 6 is engaged with a forwardly directed beam 8, provided with a slot 8ª, through which the arch 4 is directed, so that said beam may be readily swung in a direction to move the standard 6 about its swivel connection with the frame 5, in order to fully meet with the necessities of practice.

9 denotes an upstanding lever carried by the platform P, and operatively engaged with the beam 8 in order to impart the requisite swinging or lateral movement thereto.

The central portion of the platform P from a point adjacent its forward end and extending to the rear end of the platform P a cut-out portion or opening 10, through which is directed the forwardly and downwardly inclined elevator E. The elevator E comprises a frame 11 suitably supported by the platform P, and supporting at its opposite end portions the transversely disposed shafts 12, provided with the suitably spaced sprockets 14. Passing around the longitudinally alined sprockets 14 are the endless chains 15 connected by the transversely disposed and longitudinally spaced cross pieces or slats 16, between which the lifted beets or the like are seated, in order to raise or elevate the same to a desired height above the platform P.

One of the shafts 12 is extended, and said extended portion has fixed thereto a sprocket 17, also engaged with a sprocket 18 affixed to a transversely disposed shaft 19 supported by the platform P at a point therebelow. The shaft 19 is in driven connection, as at 20, with the axle A.

The upper end portion of the elevator E is rearwardly and horizontally disposed, and in order to maintain the stretches of the chains 14 in proper position, said stretches at predetermined points inwardly on the upper shaft 12 pass over the suitably supported idle sprockets 21.

The lower or forward end portion of the elevator E terminates in close proximity to the ground level and relatively close to the lifting plow 7. The lifting plow 7 is provided with rearwardly directed guide rods or fingers 22, which partially overlie the lower portion of the upper stretch of the elevator E, so that the beets as lifted from the soil by the plow 7 will be caused to properly pass upon the upper stretch of said elevator E.

The rear portion of the platform P is provided with an upstanding supporting structure S, which rotatably supports the substantially spaced and transversely directed shafts 23. The shafts 23 are provided with the sprockets 24, around which are directed the side chains 25 of an endless feed member. The chains 25 are connected by the transversely disposed strips or slats 26. The position of the shafts 23 is such as to have the upper stretch of a feed member substantially flush with the horizontal portion of the upper stretch of the elevator E.

It is also to be noted that two endless feed members are provided in my improved machine, one at each side of the elevator E, and in practice an operator stands upon the platform P at either side of the horizontal portion of the elevator E, and, as the beets are brought to such horizontal portion of the elevator E, the beets are manually transferred by the operator or operators to the upper stretch of either of the feed members, the beets being seated between the cross strips or slats 26. One of the shafts 23 is extended, and has affixed to said extended portion a sprocket 27, around which is disposed a chain 28, which is also directed around a sprocket 29 fixed to the axle A, whereby both of the endless feed members are properly driven as the machine advances.

Rotatably supported by the structure S adjacent the delivery ends of the endless feed members is a transversely disposed shaft 30, provided at each of its end portions with a cutting member 31, which operates to sever the tops from the beets carried by the endless feed members. It is to be understood in practice that the beets transferred from the elevator E to an endless feed member are arranged with their tops outwardly directed and in such position as to assure the proper cutting of the tops.

The shaft 30 has fixed thereto a sprocket 32, around which passes a chain 33, also disposed around a sprocket 34, fixed to the shaft 19, hereinbefore referred to.

Also rotatably supported by the structures

S and above the feed members are the longitudinally spaced and transversely disposed shafts 35, provided with the spaced sprockets 36 over which pass the endless chains 37. The chains 37 are connected by the transversely disposed and longitudinally spaced cross members or slats 38, and each of the slats 38 is of pronounced weight, preferably about three pounds. The lower stretches of the chains 37 are slack, so that the cross members or slats 38 will have contact with the upper stretches of the endless feed members. The cross members or slats 38 are preferably spaced apart about three inches, and in practice the beets carried by the upper stretches of the feed members are also seated between the adjacent slats 38, whereby the same are effectively held against displacement, and particularly as a result of the vibration of the machine when in operation. By this means it is assured that the beets will be properly topped by the cutting mechanism coacting with each of the endless feed members.

One of the shafts 35 is extended, and to such extended portion is affixed a sprocket 39, around which passes a chain 40. The chain 40 also passes around a sprocket 41 fixed to the shaft 19, hereinbefore referred to.

It is also to be noted that the opposed stretches of the endless feed members and the endless retaining or holding members travel in the same general direction and at the same rate of speed.

The endless feed members discharge the beets, after the tops have been severed, upon a chute C, disposed on a desired downward incline in a direction transversely of the platform P. The chute C delivers the beets or the like to an upwardly and laterally inclined elevator mechanism M, which mechanism is adapted to discharge its load within a barge or other vehicle trailing the harvester.

As herein disclosed the elevator mechanism M consists of a frame suitably supported at desired inclination, and the opposite end portions of the frame rotatably support the transversely directed shafts 42. Fixed to the shafts 42 are the sprockets 43, around which pass the side chains 44. The side chains 44 are connected by the cross members or slats 45, between which the beets seat, and are carried upwardly for discharge into a barge or the like. The lower shaft 42 has an extended portion provided with a gear 46, meshing with a gear 47 fixed to the shaft 19, whereby desired movement is given to the endless member of the elevating mechanism as the machine advances.

The opposite end portions of the axle A are provided with the clutch members 48, preferably of a friction type, which coact with the wheels W, so that when it is desired the wheels W may be permitted to rotate independently of the axle A, which is of particular advantage when the harvester is being transported.

Also carried by the forward portions of the platform P are the upstanding levers 49, of a conventional type, each provided with a latch mechanism 50 coacting with the rack 51. One of the levers 49 extends below the platform P, and is operatively engaged through the instrumentality of the flexible member 52 with the rear portion of the frame 5, whereby the plow 7 may be raised. To facilitate the functioning of this lever the flexible member 52 passes over the grooved guide pulley 53.

The second lever 49 is operatively engaged by the member 54 with an upstanding arm of a bell crank lever 55, and the second arm of said lever is connected by the member 56 with the forward end portion of the frame 5. By this means the second lever 49 can be readily employed for lowering the lifting plow 7 and thereby control its depth of penetration.

The clutch member 48 may be properly shifted in unison in any manner desired, and as diagrammatically indicated by dotted lines in Fig. 2, each of said members 48 has operatively engaged therewith a rod 63 operatively engaged with an upstanding lever 64 of any ordinary or preferred type. Upon requisite swinging or rocking movement of the lever 64 the clutch members 48 will be shifted either into or out of clutching action as may be occasioned by the requirements of practice.

From the foregoing description it is thought to be obvious that a harvester constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A machine of the class described comprising an endless feed member having its upper stretch substantially horizontally disposed, a severing medium positioned adjacent said feed member, an endless retaining member positioned above the feed member, the lower stretch of the retaining member being slack and engaging by gravity the upper stretch of the feed member, and means for imparting movement to the feed member and the retaining member at substantially the same rate of travel.

2. A machine of the class described comprising an endless feed member having its upper stretch substantially horizontally disposed, a severing medium positioned adjacent said feed member, an endless retaining member positioned above the feed member, the lower stretch of the retaining member being slack and engaging by gravity the upper stretch of the feed member, and means for imparting movement to the feed member and the retaining member at substantially the same rate of travel, a portion of the lower stretch of the retaining member in contact with the upper stretch of the feed member extending from the severing medium to a point materially in advance of said severing medium.

In testimony whereof I hereunto affix my signature.

CLARENCE W. HOUGLAND.